United States Patent Office 3,652,568
Patented Mar. 28, 1972

3,652,568
DIPHENYL METHOXYALKYL-PIPERAZINYL-4-ACETIC ACID-ANILIDE COMPOUNDS AND THERAPEUTIC COMPOSITIONS
Werner Winter and Max Thiel, Mannheim, Kurt Stach, Wolfgang Schaumann, and Karl Dietmann, Mannheim-Waldhof, and Wolfgang Juhran, Mannheim, Germany, assignors to Boehringer Mannheim GmbH, Mannheim, Germany
No Drawing. Filed Sept. 15, 1969, Ser. No. 858,169
Claims priority, application Germany, Sept. 21, 1968,
P 17 95 375.2
Int. Cl. C07d 51/70
U.S. Cl. 260—268 BZ
10 Claims

ABSTRACT OF THE DISCLOSURE

Basic ethers characterized by coronary dilating activity having the formula:

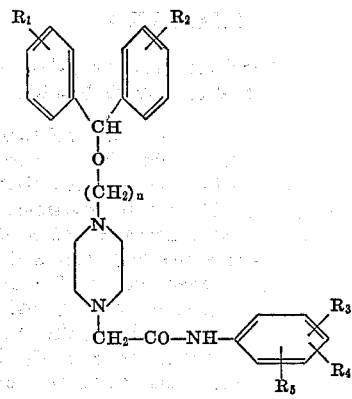

wherein $R_1$ and $R_2$ each designate hydrogen, halogen or lower alkyl, $R_3$, $R_4$ and $R_5$ each designate hydrogen, halogen, lower alkyl, alkoxy or trifluoromethyl, and $n$ is 2 or 3, and non toxic salts of said basic ethers.

---

The present invention relates to basic ethers and to their acid addition salts and to a process of making and using the same. The invention further relates to valuable pharmaceutical compositions comprising such new and valuable basic ethers.

The new and valuable basic ethers as they are produced according to the process of the present invention correspond to the following formula:

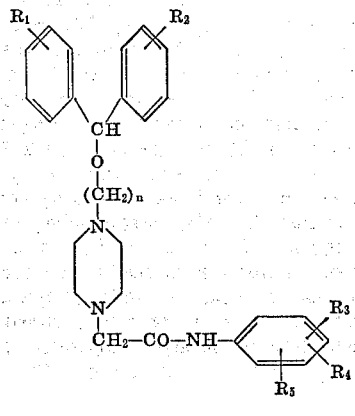

wherein $R_1$ and $R_2$, which may be the same or different, each represent hydrogen, halogen, or lower alkyl, $R_3$, $R_4$ and $R_5$, which may be the same or different, each represent hydrogen, halogen, lower alkyl, alkoxy or trifluoromethyl, and $n$ is 2 or 3; and the pharmaceutically acceptable salts thereof.

The new compounds (I) according to the present invention are useful in the preparation of medicinal agents. The compounds are useful because of their unexpectedly good coronary dilating action.

Said new compounds (I) according to the present invention can be obtained, for example, by the following methods:

(a) reaction of a basic ether of the formula:

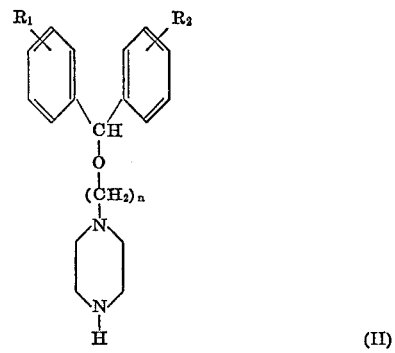

in which $R_1$, $R_2$ and $n$ have the meanings as given hereinabove, with a haloacetanilide of the formula:

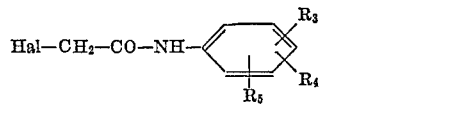

in which $R_3$, $R_4$ and $R_5$ indicate the same groups and substituents as stated hereinbefore and Hal is halogen; or (b) reaction of a piperazine derivative of the formula:

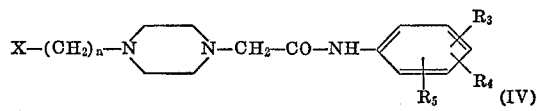

in which $R_3$, $R_4$ and $R_5$ indicate the same groups and substituents as stated hereinbefore and X is a reactive ester group, with a compound of the formula:

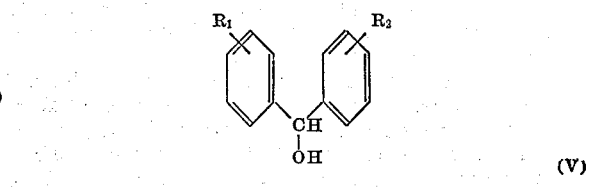

in which $R_1$ and $R_2$ indicate the same groups and substituents as given above; or (c) reaction of a reactive derivative of an acid of the formula:

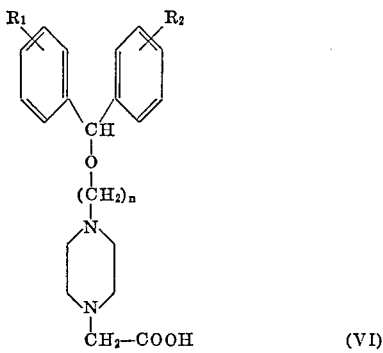

(VI)

in which $R_1$, $R_2$ and $n$ have the meanings given hereinbefore, with an aniline derivative of the formula:

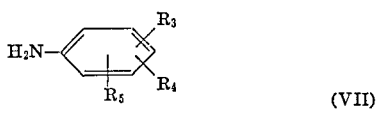

(VII)

in which $R_3$, $R_4$ and $R_5$ have the same meanings as given above; whereafter, if desired, the free bases thusly obtained are converted into their corresponding pharmacologically compatible salts.

As piperazine derivatives (IV), having a reactive ester group X, the halides are particularly preferred, although, in principle, it is also possible to use reactive sulfonic acid esters, for example, tosylates, mesylates or brosylates.

The compounds (V) can be used either directly or in the form of their activated derivatives, for example, as alcoholates. The alcoholates are obtained by the reaction of the free secondary alcohols with alkali metals or with strongly basic compounds thereof, such as alkali metal aryls, alkali metal alkylenes or alkali metal amides. Further activated derivatives are obtained by the metallization of the secondary alcohol group with the use of Grignard reagents.

As reactive acid derivatives (VI), the acid halides, esters, imidazolides and the like are particularly preferred.

The piperazine derivatives (IV) used as starting materials can be obtained, for example, by the reaction of N-benzyl-piperazine with haloacetanilides (III), hydrogenolysis of the benzyl radical and subsequent N-alkylation with a bivalent alkylation agent of the formula:

$$X—(CH_2)_n—X' \qquad (VIII)$$

in which X and $n$ have the same meanings as given above and X' is a reactive ester group which is different from X.

In order to direct the reaction as completely as possible in the desired direction and in order to avoid double reaction, it has proved to be advantageous to use those alkylation agents (VIII) in which the ester group X' has a greater reactivity than the ester group X. Thus, for example, tosyl and brosyl groups react considerably more rapidly with the secondary amino group of the piperazine than the halogen-substituted part of the compounds (VIII).

The preparation of the acids or of their reaction products (VI) used as starting materials takes place by the reaction of compounds (II) with chloroacetic acid or with chloroacetic acid esters followed possibly by treatment with inorganic acid chlorides.

The pharmacologically compatible salts are obtained in the conventional manner, for example, by neutralization of the free bases (I) with a non-toxic inorganic or organic acid, for example, hydrochloric acid, sulfuric acid, phosphoric acid, hydrobromic acid, acetic acid, lactic acid, citric acid, oxalic acid, malic acid, salicylic acid, malonic acid, maleic acid, benzoic acid, tartaric acid, succinic acid and related acids.

The new compounds (I) according to the present invention and the salts thereof can be administered enterally or parenterally in liquid or solid form in admixture with liquid or solid pharmaceutical carriers or diluents. Water is preferably used as an injection medium which can contain the conventional additives, such as stabilization agents, solubilizing agents and buffers, i.e., they are employed in the form of injectable solutions in water isotonic salt solutions. Additives of the types included, for example, in the injectable solutions, are tartrate and citrate buffers, ethanol, complex-forming agents (such as ethylene-diamine-tetraacetic acid and the non-toxic salts thereof), high molecular weight polymers (such as liquid polyethylene oxide) for the regulation of viscosity. As solid pharmaceutical carriers there may be used for example, starch, dextrose, lactose, mannitol, methyl cellulose, talc, highly dispersed silicic acids, high molecular weight fatty acids (such as stearic acid), gelatine, agar-agar, calcium phosphate, magnesium stearate, animal and vegetable fats, solid high molecular weight polymers (such as polyethylene glycols, pectins); for oral administration, the compositions can, if desired, also contain flavoring and sweetening agents.

The invention is further disclosed by the following example, which is given merely for the purpose of illustrating specific embodiments of the invention, without limiting in spirit or in scope.

EXAMPLE 1

1-[1-(4,4'-difluorobenzhydryloxy)-propyl-3]-piperazinyl-4-acetic acid-2,6-dimethyl-anilide 6.8 g. (0.02 mol) 1-[1-(4,4'-difluorobenzhydryloxy)-propyl-3]-piperazine were boiled for 5 hours in 50 ml. tetrahydrofuran with 3.94 g. (0.02 mol) N-chloroacetyl-2,6-dimethylaniline and 13.8 ml. triethylamine. The major portion of the solvent was thereafter taken off in vacuo, the residue treated with water and ether and the organic layer thereby obtained separated off. The organic layer was thereafter evaporated under vacuum and a sufficient quantity of ethyl acetate was added to the residue that an almost saturated solution was obtained. By the addition of alcoholic hydrochloric acid, there was obtained the hydrochloride of the desired basic ether which was recrystallized from methanol. There were thusly obtained 8.4 g. (72.2% of theory) 1-[1-(4,4'-difluorobenzhydryloxy)-propyl - 3]-piperazinyl-4-acetic acid-2,6-dimethylanilide hydrochloride, which had a melting point of 222–223° C.

The 1-[1-(4,4'-difluorobenzhydryloxy)-propyl-3]-piperazine used as starting material was obtained by the following method:

A solution of 147 g. (0.67 mol) 4,4'-difluorobenzhydrol in 250 ml. toluene was added to 27.3 g. (0.7 mol) sodamide in 250 ml. toluene and the reaction mixture boiled for 3.5 hours. Thereafter a solution of 172 g. (0.68 mol) 1-(1-chloropropyl-3)-4-benzyl-piperazine in 100 ml. toluene was added to the resulting mixture in dropwise fashion at ambient temperature, followed by heating under reflux for 3 hours. The reaction mixture was then cooled and mixed with 100 ml. water. The organic layer was separated off, dried over anhydrous sodium sulfate and, after stripping off of the solvent, subjected to high vacuum distillation. There were obtained 201.7 g. (69% of theory) 1-[1-(4,4'-difluorozenzhydryloxy)-propyl-3]-4-benzyl-piperazine, which had a boiling point of 243–254° C./0.05 mm. Hg. The corresponding hydrochloride had a melting point of 228–229° C. Following pressureless hydrogenation carried out in methanolic solution, using 10% palladium charcoal as catalyst, separation of the catalyst and distillation, there was obtained 1-[1-(4,4'-difluorobenzhydryloxy)-propyl-3]-piperazine in a yield of 71% of theory, having a boiling point of 188–198° C./0.1 mm. Hg.

The compounds set out in the following table were prepared in an analogous manner:

TABLE

| Compound | M.P., °C. | Yield (percent of theory) |
|---|---|---|
| 1-[1-(4,4'-difluorobenzhydryloxy)-propyl-3]-piperazinyl-4-acetic acid-2,4-dimethyl-anilide | ¹ 197–198 | 78.5 |
| 1-[1-(4,4'-difluorobenzhydryloxy)-propyl-3]-piperazinyl-4-acetic acid-2-chloro-6-methyl-anilide | ¹ 198–200 | 80 |
| 1-[1-(4,4'-difluorobenzhydryloxy)-propyl-3]-piperazinyl-4-acetic acid-2-methyl-3-chloro-anilide | ¹ 203–204 | 76.7 |
| 1-[1-(4,4'-difluorobenzhydryloxy)-propyl-3]-piperazinyl-4-acetic acid-2-methyl-4-chloro-anilide | ¹ 201–202 | 78.4 |
| 1-[1-(4,4'-difluorobenzhydryloxy)-propyl-3]-piperazinyl-4-acetic acid-2,6-dichloro-anilide | ¹ 178–180 | 77.5 |
| 1-[1-(4,4'-difluorobenzhydryloxy)-propyl-3]-piperazinyl-4-acetic acid-4-fluoro-anilide | ¹ 238 | 75.5 |
| 1-[1-(4,4'-difluorobenzhydryloxy)-propyl-3]-piperazinyl-4-acetic acid-2-methyl-5-chloro-anilide | ¹ 202–203 | 82.5 |
| 1-[1-(4,4'-difluorobenzhydryloxy)-propyl-3]-piperazinyl-4-acetic acid-3-chloro-4-methyl-anilide | ¹ 196–197 | 75.9 |
| 1-[1-(4,4'-difluorobenzhydryloxy)-ethyl-2]-piperazinyl-4-acetic acid-2,6-dimethyl-anilide | ¹ 208–209 | 68 |
| 1-[1-(4,4'-difluorobenzhydryloxy)-ethyl-2]-piperazinyl-4-acetic acid-2,6-dichloro-anilide | ¹ 208–209 | 73 |
| 1-[1-(benzhydryloxy)-propyl-3]-piperazinyl-4-acetic acid-2,6-dimethyl-anilide | ¹ 228 | 71 |
| 1-[1-(4,4'-dichlorobenzhydryloxy)-propyl-3]-piperazinyl-4-acetic acid-2,6-dichloro-anilide | ² 149 | 76 |
| 1-[1-(4,4'-dichlorobenzhydryloxy)-propyl-3]-piperazinyl-4-acetic acid-2,6-dimethyl-anilide | ² 150 | 82 |
| 1-[1-(4,4'-dimethyl-benzhydryloxy)-propyl-3]-piperazinyl-4-acetic acid-2,6-dichloro-anilide | ² 145 | 75 |
| 1-[1-(4,4'-dimethyl-benzhydryloxy)-propyl-3]-piperazinyl-4-acetic acid-2,6-dimethyl-anilide | ² 153 | 81 |
| 1-[1-(4,4'-difluorobenzhydryloxy)-propyl-3]-piperazinyl-4-acetic acid-2-methoxy-5-chloro-anilide | ¹ 141 | 76 |
| 1-[1-(4,4'-difluorobenzhydryloxy)-propyl-3]-piperazinyl-4-acetic acid-3-chloro-4-methoxy-anilide | ¹ 215–216 | 71 |
| 1-[1-(4,4'-difluorobenzhydryloxy)-propyl-3]-piperazinyl-4-acetic acid-2-trifluoromethyl-anilide | ¹ 186 | 68 |
| 1-[1-(4,4'-difluorobenzhydryloxy)-propyl-3]-piperazinyl-4-acetic acid-3-trifluoromethyl-anilide | ¹ 186 | 62 |
| 1-[1-(4,4'-dichlorobenzhydryloxy)-propyl-3]-piperazinyl-4-acetic acid-2,4,6-trichloro-anilide | ² 153 | 77 |

¹ Hydrochloride.
² Maleate.

A most important prerequisite for therapeutic agents to be used for the treatment of ischemic heart disease as for instance angina pectoris, coronary angiopathies and the like is that they be effective following oral administration. As comparison compound Lidoflazine (4-[4,4-bis(p-fluorophenyl)butyl] - 1 - piperazineaceto-2',6'-xylidide) was used. This compound is known to be well resorbed following enteral administration in the dog. (Jagenau, A & W Schafer: The effectiveness of Lidoflazine and other coronary vasodilators following oral administration to the trained non-anesthetized dog. Arzneimittel-Forsch. 17, 582 (1967).) Data establishing the corresponding effectiveness of Lidoflazine in man, i.e., clinical-pharmacological data following oral administration has never been obtained. Because of this lack of correlation between the dog and man, the dog is not a good test animal for use in evaluating the enteric effectiveness of Lidoflazine and of chemically similar products.

It has been established after long periods of research that the pig is a better choice of experimental animal where the tests to be carried out involve the enteral effectivenesses of coronary active substances.

The test procedures which were carried out were directed to establishing the effectiveness of the compounds of the invention as compared to Lidoflazine following enteral administration to the pig in bringing about an increase in the blood circulating within the coronary system.

Procedure

Normal, domesticated pigs ("Läufer" weighing from 60 to 70 kg.) were subjected to surgery for implanting electromagnetic flow measuring devices. The operation was carried out under aseptic surgical conditions. In order to determine the zero-line and for causing a reactive hyperemia for determining the maximum coronary reserve, clasp cuffs which could be inflated were arranged on the periphery of the flow meter measuring device. In addition a chronic catheter was surgically implanted in the femoral artery and femoral vein of each animal. After an uncomplicated period of recovery had elapsed, the pigs were utilized in the tests for measuring changes in coronary blood flows.

Results

It has been established experimentally that the maximum increase in coronary blood flow in the pig amounts to twice and at the most to three times the conrol value. Tha is, in contrast to man and dog, the coronary reserve in the pig is only half that of dog and man. The measuring procedures provided extremely reliable results and it was considered that an increase in the coronary blood circulation of 30%, as measured following enteral administration of a test compound, was indicative of a remarkable effectiveness.

The following compounds were utilized in the test procedures:

(A) 4-[4,4-bis(p-fluorophenyl)butyl]-1-piperazine-aceto-2',6'-xylidide-Lidoflazine (B) 1-[1-(4,4'-difluorobenzhydryloxy)-propyl-3]-piperazinyl-4-acetic acid-3-chloro-4-methyl-anilide (C) 1-[1-(4,4'-dichlorobenzhydryloxy)-propyl-3]-piperazinyl-4-acetic acid-2,6-dichloro-anilide (D) 1-[1-(4,4'-dichlorobenzhydryloxy)-propyl-3]-piperazinyl-4-acetic acid-2,6-dimethyl-anilide (E) 1-[1-(4,4'-dimethylbenzhydryloxy)-propyl-3]-piperazinyl-4-acetic acid-2,6-dimethyl-anilide The results of the experimental procedures are set out in the following table:

TABLE

| Substance | Dose in mg./kg. enteral administration | Maximum increase of the coronary blood circulation |
|---|---|---|
| A | 40 | No effectiveness. |
| B | 40 | +100%. |
| C | 40 | 30%. |
| D | 40 | 30%. |
| E | 40 | 30%. |

As can be seen from the table, following administration of 40 mg./kg. of Lidoflazine (comparison compound), no increase in the coronary blood circulation was observed. In complete contrast, the compounds of the invention all brought about an increase of the coronary blood flow amounting to from 30 to 100%. The data unequivocally established that following enteral administration of the compounds of the invention a markedly effective change in the coronary blood flow takes place. This is in complete contrast to Lidoflazine and serves to readily distinguish the compounds of the invention from Lidoflazine.

The increase in the coronary blood flow as reported in the table extends over the maximum increase, the period of effectiveness of each of the compounds of the invention extending over several hours.

It has not been established nor can any assumption be made regarding the absence of any activity on the part of Lidoflazine, i.e., that this absence is due to inadequate resorption, metabolism of the Lidoflazine in the liver or to its extremely high binding to protein in the blood.

The compounds of the invention are used enterally in dosage unit form in amounts of from 5–50 mg., preferably 10–25 mg., active ingredient per dosage unit; 2 to 6 doses per day are acceptable. For parenteral administration 1–10 mg. of active compound per dosage unit are used.

We claim:
1. A compound selected from the group consisting of basic ether corresponding to the formula:

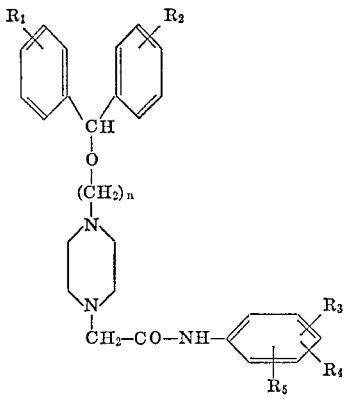

and a pharmaceutically acceptable salt of said basic ether, wherein $R_1$ and $R_2$ each represent a member selected from the group consisting of hydrogen, halogen and lower alkyl, $R_3$, $R_4$ and $R_5$ are each a member selected from the group consisting of hydrogen, halogen, lower alkyl, lower alkoxy and trifluoromethyl and $n$ is 2 or 3.

2. A compound according to claim 1 designated 1-[1-(4,4'-difluorobenzhydryloxy) - propyl-3] - piperazinyl-4-acetic acid-3-chloro-4-methylanilide.

3. A compound according to claim 1 designated 1-[1-(4,4'-dichlorobenzhydryloxy) - propyl - 3] - piperazinyl-4-acetic acid-2,6-dichloro-anilide.

4. A compound according to claim 1 designated 1-[1-(4,4'-dichlorobenzhydryloxy) - propyl-3] - piperazinyl-4-acetic acid-2,6-dimethyl-anilide.

5. A compound according to claim 1 designated 1-[1-(4,4'-dimethylbenzhydryloxy) - propyl-3] - piperazinyl-4-acetic acid-2,6-dimethyl-anilide.

6. A compound according to claim 1 designated 1-[1-(4,4'-difluorobenzylhydryloxy) - propyl-3] - piperazinyl-4-acetic acid-2-methoxy-5-chloro-anilide.

7. A compound according to claim 1 designated 1-[1-(4,4'-difluorobenzylhydryloxy) - propyl - 3]-piperazinyl-4-acetic acid-2-trifluoromethyl-anilide.

8. A compound according to claim 1 designated 1-[1-(4,4'-dichlorobenzhydryloxy) - propyl-3] - piperazinyl-4-acetic acid-2,4,6-trichloro-anilide.

9. A compound according to claim 1 wherein said salt is a hydrochloride.

10. A compound according to claim 1 wherein said salt is a maleate.

References Cited

UNITED STATES PATENTS

| 2,988,551 | 6/1961 | Morrow | 260—268 R |
| 3,462,491 | 8/1969 | Kaisen | 260—268 BZ |

FOREIGN PATENTS

| 396,007 | 1/1966 | Switzerland | 260—268 BZ |
| 32,41M | 4/1965 | France | 260—268 R |

DONALD G. DAUS, Primary Examiner

U.S. Cl. X.R.

260—268 R, 562 R, 562 B, 562 A, 578, 618 B; 424—250